United States Patent
Li et al.

(10) Patent No.: US 10,349,432 B2
(45) Date of Patent: Jul. 9, 2019

(54) SEMI-PERSISTENT SCHEDULING FOR LOW-LATENCY COMMUNICATIONS

(71) Applicant: QUALCOMM Incorporated, San Diego, CA (US)

(72) Inventors: Chong Li, Weehawken, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 15/388,242

(22) Filed: Dec. 22, 2016

(65) Prior Publication Data

US 2018/0184443 A1 Jun. 28, 2018

(51) Int. Cl.
*H04W 52/02* (2009.01)
*H04W 72/10* (2009.01)
*H04W 72/12* (2009.01)
*H04W 76/38* (2018.01)

(52) U.S. Cl.
CPC ... *H04W 72/1247* (2013.01); *H04W 52/0235* (2013.01); *H04W 72/1252* (2013.01); *H04W 72/1268* (2013.01); *H04W 72/1273* (2013.01); *H04W 72/1278* (2013.01); *H04W 72/1289* (2013.01); *H04W 72/10* (2013.01); *H04W 76/38* (2018.02); *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/21* (2018.01); *Y02D 70/22* (2018.01)

(58) Field of Classification Search
None
See application file for complete search history.

(56) References Cited

U.S. PATENT DOCUMENTS

2016/0066316 A1* 3/2016 Bhushan ........... H04W 72/0446
  370/329
2016/0119969 A1  4/2016 Vajapeyam et al.
2016/0205703 A1* 7/2016 Dudda .................. H04W 76/38
  455/452.1

(Continued)

FOREIGN PATENT DOCUMENTS

WO  WO2016029352 A1  3/2016

OTHER PUBLICATIONS

ISA/EP, International Search Report and Written Opinion of the International Searching Authority, Int'l Application No. PCT/US2017/063312, dated Feb. 20, 2018, European Patent Office, Rijswijk, NL, 14 pgs.

(Continued)

*Primary Examiner* — Jutai Kao
(74) *Attorney, Agent, or Firm* — Holland & Hart LLP

(57) ABSTRACT

Methods, systems, and devices for wireless communication are described for SPS for low-latency communications. A wireless communication device may establish a block of semi-persistent scheduling (SPS) resources in each of a plurality of transmission time intervals (TTIs) for transmission of priority traffic, and determine that a level of priority traffic to transmit during a first TTI of the plurality of TTIs is below a priority traffic threshold. The wireless communication device may transmit a per-TTI release signal to indicate that the block of SPS resources in the first TTI is released from being reserved for priority traffic.

34 Claims, 15 Drawing Sheets

(56) References Cited

U.S. PATENT DOCUMENTS

2018/0042043 A1* 2/2018 Babaei .............. H04W 72/1273

OTHER PUBLICATIONS

Nokia et al., "Enhanced Semi-Persistent Scheduling for 5G URLLC," 3GPP TSG-RAN WG1 Meeting #87, R1-1612251, Reno, USA, Nov. 14-18, 2016, 8 pgs., XP051190365, 3rd Generation Partnership Project.

* cited by examiner

US 10,349,432 B2

SEMI-PERSISTENT SCHEDULING FOR LOW-LATENCY COMMUNICATIONS

BACKGROUND

The following relates generally to wireless communication, and more specifically to semi-persistent scheduling for low-latency communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Multiple types of traffic may be communicated in a wireless communication system. In some cases, different performance metrics of the different types of traffic may cause some types of traffic to have a higher priority than others. One example of a type of traffic in a wireless communication system may include ultra-reliability low-latency communications (URLLC), also sometimes referred to as mission-critical communications, which may specify that packets are communicated with low latency and with high-reliability. URLLC or mission-critical communications may be examples of communications having a high priority, or a priority that is above a threshold. Low priority communications include communications that have a priority that is below a threshold. Examples of communications having a priority level that is less than that of URLLC or mission-critical communications include enhanced mobile broadband (eMBB) communications. A wireless communication system may designate resources to be used for various types of communications, such as high priority or low priority traffic.

SUMMARY

The described techniques relate to improved methods, systems, devices, or apparatuses that support semi-persistent scheduling (SPS) for low-latency communications. Generally, the described techniques provide for a per-transmission time interval (TTI) release of a block of SPS resources. Beneficially, communication automatically resumes in a block of SPS resources in a next TTI unless another per-TTI release signal is received. Advantageously, the examples may satisfy the low latency and the ultra-reliability requirement for ultra-reliability low-latency communications (URLLC).

A method of wireless communication is described. The method may include establishing a block of SPS resources in each of a plurality of TTIs for transmission of priority traffic, determining that a level of priority traffic to transmit during a first TTI of the plurality of TTIs is below a priority traffic threshold, and transmitting a per-TTI release signal to indicate that the block of SPS resources in the first TTI is released from being reserved for priority traffic.

An apparatus for wireless communication is described. The apparatus may include means for establishing a block of SPS resources in each of a plurality of TTIs for transmission of priority traffic, means for determining that a level of priority traffic to transmit during a first TTI of the plurality of TTIs is below a priority traffic threshold, and means for transmitting a per-TTI release signal to indicate that the block of SPS resources in the first TTI is released from being reserved for priority traffic.

Another apparatus for wireless communication is described. The apparatus may include a processor, memory in electronic communication with the processor, and instructions stored in the memory. The instructions may be operable to cause the processor to establish a block of SPS resources in each of a plurality of TTIs for transmission of priority traffic, determine that a level of priority traffic to transmit during a first TTI of the plurality of TTIs is below a priority traffic threshold, and transmit a per-TTI release signal to indicate that the block of SPS resources in the first TTI is released from being reserved for priority traffic.

A non-transitory computer readable medium for wireless communication is described. The non-transitory computer-readable medium may include instructions operable to cause a processor to establish a block of SPS resources in each of a plurality of TTIs for transmission of priority traffic, determine that a level of priority traffic to transmit during a first TTI of the plurality of TTIs is below a priority traffic threshold, and transmit a per-TTI release signal to indicate that the block of SPS resources in the first TTI is released from being reserved for priority traffic.

Some examples of the method, apparatus, and non-transitory computer-readable medium described above may further include processes, features, means, or instructions for refraining from transmitting priority traffic during the first TTI. Some examples of the method, apparatus, and non-transitory computer-readable medium described above may further include processes, features, means, or instructions for transmitting lower priority traffic on the block of SPS resources in the first TTI.

Some examples of the method, apparatus, and non-transitory computer-readable medium described above may further include processes, features, means, or instructions for determining that the priority traffic may be available for transmission in a subsequent TTI of the plurality of TTIs, the subsequent TTI occurring immediately after the first TTI. Some examples of the method, apparatus, and non-transitory computer-readable medium described above may further include processes, features, means, or instructions for transmitting priority traffic in the block of SPS resources in the subsequent TTI.

In some examples of the method, apparatus, and non-transitory computer-readable medium described above, transmitting the per-TTI release signal comprises transmitting the per-TTI release signal in the first TTI, wherein the wireless node may be a base station and the priority traffic may be downlink priority traffic. In some examples of the method, apparatus, and non-transitory computer-readable medium described above, transmitting the per-TTI release signal comprises transmitting the per-TTI release signal in a second TTI of the plurality of TTIs, wherein the second TTI precedes the first TTI, wherein the wireless node may be a user equipment (UE) and the priority traffic may be uplink priority traffic.

Some examples of the method, apparatus, and non-transitory computer-readable medium described above may further include processes, features, means, or instructions for instructing a transmitter to enter a low power state during at least a portion of the first TTI. In some examples of the method, apparatus, and non-transitory computer-readable medium described above, each of the plurality of TTIs includes a control channel that temporally precedes a data channel. In some examples of the method, apparatus, and non-transitory computer-readable medium described above, transmitting the per-TTI release signal comprises transmitting the per-TTI release signal in a control channel of the first TTI.

In some examples of the method, apparatus, and non-transitory computer-readable medium described above, transmitting the per-TTI release signal comprises transmitting the per-TTI release signal in a data channel of a preceding TTI of the plurality of TTIs, wherein the preceding TTI occurs immediately prior to the first TTI. In some examples of the method, apparatus, and non-transitory computer-readable medium described above, the per-TTI release signal may be a single bit.

A method of wireless communication is described. The method may include establishing a block of SPS resources in each of a plurality of TTIs for reception of priority traffic and receiving a per-TTI release signal indicating that the block of SPS resources in a first TTI of the plurality of TTIs is released from being reserved for priority traffic.

An apparatus for wireless communication is described. The apparatus may include means for establishing a block of SPS resources in each of a plurality of TTIs for reception of priority traffic and means for receiving a per-TTI release signal indicating that the block of SPS resources in a first TTI of the plurality of TTIs is released from being reserved for priority traffic.

Another apparatus for wireless communication is described. The apparatus may include a processor, memory in electronic communication with the processor, and instructions stored in the memory. The instructions may be operable to cause the processor to establish a block of SPS resources in each of a plurality of TTIs for reception of priority traffic and receive a per-TTI release signal indicating that the block of SPS resources in a first TTI of the plurality of TTIs is released from being reserved for priority traffic.

A non-transitory computer readable medium for wireless communication is described. The non-transitory computer-readable medium may include instructions operable to cause a processor to establish a block of SPS resources in each of a plurality of TTIs for reception of priority traffic and receive a per-TTI release signal indicating that the block of SPS resources in a first TTI of the plurality of TTIs is released from being reserved for priority traffic.

Some examples of the method, apparatus, and non-transitory computer-readable medium described above may further include processes, features, means, or instructions for releasing, based at least in part on the per-TTI release signal, the block of SPS resources in the first TTI from being reserved for priority traffic. Some examples of the method, apparatus, and non-transitory computer-readable medium described above may further include processes, features, means, or instructions for receiving lower priority traffic on the block of SPS resources in the first TTI.

Some examples of the method, apparatus, and non-transitory computer-readable medium described above may further include processes, features, means, or instructions for monitoring for a subsequent per-TTI release signal for determining whether the block of SPS resources in a subsequent TTI of the plurality of TTIs may be released from exclusive priority traffic use. In some examples of the method, apparatus, and non-transitory computer-readable medium described above, receiving the per-TTI release signal comprises receiving the per-TTI release signal in the first TTI, wherein the wireless node may be a user equipment (UE) and the priority traffic may be downlink priority traffic. In some examples of the method, apparatus, and non-transitory computer-readable medium described above, receiving the per-TTI release signal comprises receiving the per-TTI release signal in a second TTI of the plurality of TTIs, wherein the second TTI precedes the first TTI, wherein the wireless node may be a base station and the priority traffic may be uplink priority traffic.

Some examples of the method, apparatus, and non-transitory computer-readable medium described above may further include processes, features, means, or instructions for instructing a decoder to enter a low power state during at least a portion of the first TTI based at least in part on the per-TTI release signal. In some examples of the method, apparatus, and non-transitory computer-readable medium described above, each of the plurality of TTIs includes a control channel that temporally precedes a data channel.

In some examples of the method, apparatus, and non-transitory computer-readable medium described above, receiving the per-TTI release signal comprises receiving the per-TTI release signal in a control channel of the first TTI. In some examples of the method, apparatus, and non-transitory computer-readable medium described above, receiving the per-TTI release signal comprises receiving the per-TTI release signal in a data channel of a preceding TTI of the plurality of TTIs, wherein the preceding TTI occurs immediately prior to the first TTI. In some examples of the method, apparatus, and non-transitory computer-readable medium described above, the per-TTI release signal may be a single bit.

DETAILED DESCRIPTION

Figure 1:
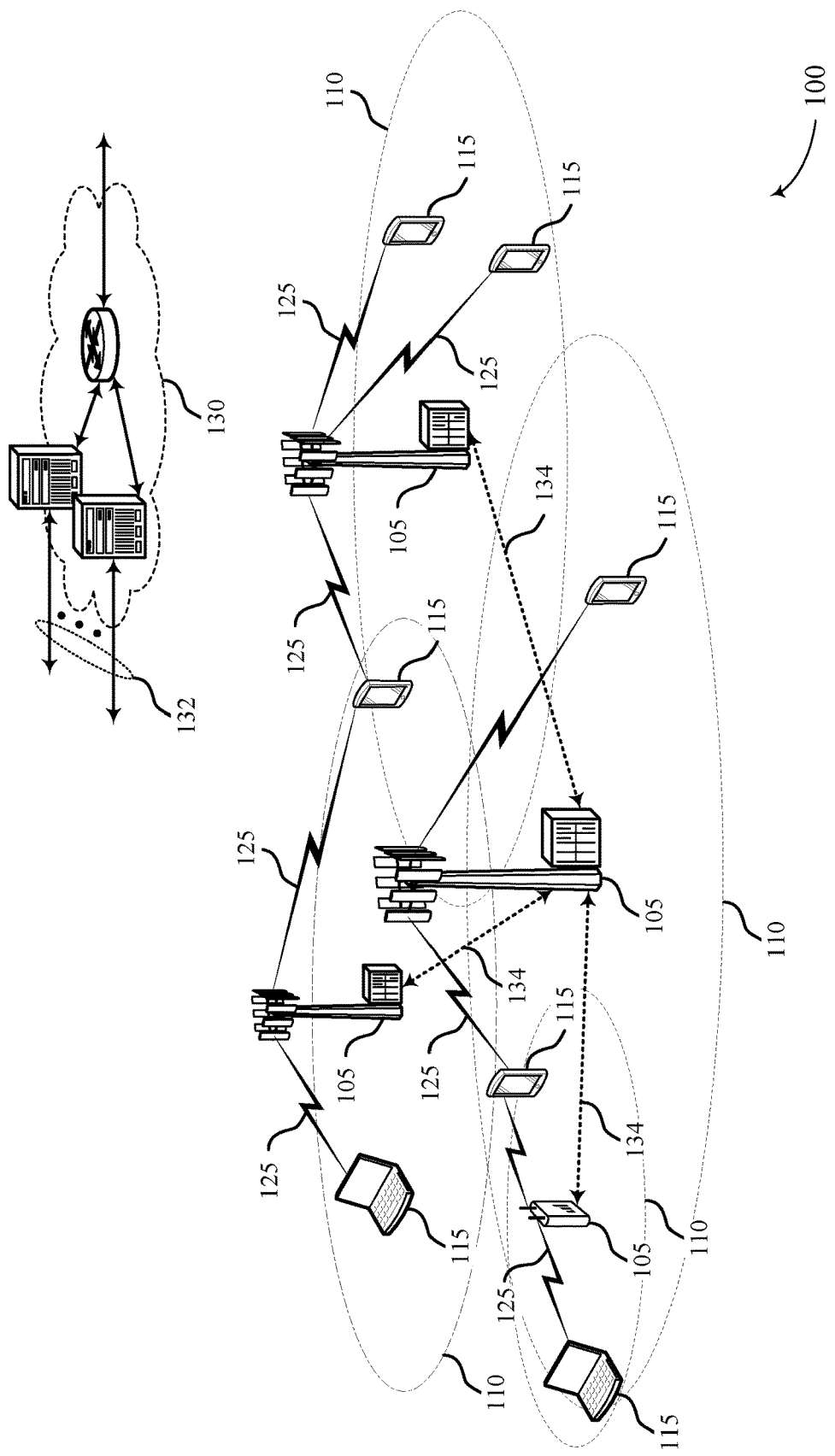
FIG. 1 illustrates an example of a system for wireless communication that supports semi-persistent scheduling (SPS) for low-latency communications in accordance with aspects of the present disclosure.

Techniques are disclosed for semi-persistent scheduling (SPS) for low-latency communications. Wireless communication systems may communicate priority traffic using ultra-reliability low-latency communications (URLLC) SPS. SPS resources may be assigned using radio resource control (RRC) signaling to user equipments (UEs) which support URLLC (referred to herein as URLLC UEs or UEs). RRC signaling may indicate a period of transmission time intervals (TTIs) on which the SPS resources and other attributes (e.g., modulation and coding scheme (MCS)) are explicitly assigned to URLLC UEs. A base station may use URLLC SPS resources to transmit downlink priority traffic. A UE may use URLLC SPS resources to transmit uplink priority traffic.

Control channels are used to signal control data between UEs and base stations, but were not designed to meet the low latency and ultra-high reliability constraints of URLLC. These two constraints make it challenging to design a highly reliable control channel for scheduling of resource blocks. In a typical transmission scenario, wireless communication devices may communicate over a shared communication medium using TTIs that include uplink and downlink channels. The uplink and downlink channels may be further divided into resource blocks, and each resource block may be allocated to a wireless communication device for uplink and downlink communication. A scheduling assignment may be communicated to let a particular wireless communication device know what one or more resource blocks have been assigned to it for uplink and/or downlink communication.

Two commonly used scheduling techniques are dynamic scheduling and SPS. These conventional scheduling techniques, however, do not satisfy the low latency and ultra-high reliability constraints of URLLC. Dynamic scheduling may not be feasible for URLLC. To meet the low latency requirement for URLLC, resource blocks occurring within a TTI are to be scheduled within that same TTI. To meet the ultra-reliability requirement, a receiver is to receive and properly decode a scheduling assignment sent within that TTI. Failing to properly decode the scheduling assignment within that TTI would violate the low latency requirement, as it would take too long to request retransmission and receive the retransmitted scheduling assignment. Thus, dynamic scheduling would require a one-shot transmission of the scheduling assignment to meet the low latency requirement along with requiring the receiver to properly decode the transmitted scheduling assignment (without requesting retransmission) to meet the ultra-reliability requirement. These assumptions are not realistic for most wireless communication systems and hence dynamic scheduling is not practical to use for URLLC.

Conventional SPS techniques are also deficient. In SPS, a transmitter and receiver schedule, in advance, one or more resource blocks in one or more TTIs that are to be used for upcoming uplink and/or downlink communication. Channel utilization, however, is an issue for conventional SPS techniques as there are times when the transmitter, receiver, or both, may lack data to communicate in one or more blocks of SPS resources. Failing to communicate in even one block of SPS resources detrimentally impacts channel utilization.

To maintain channel utilization at an acceptable level, conventional SPS techniques permit a transmitter to dynamically release a block of SPS resources to enable transport of other traffic if the transmitter does not have data available to communicate. When data becomes available, the transmitter may send a dynamic activation message and resume use of the block of SPS resources. Conventional dynamic release and/or dynamic activation techniques have the same issues as the above-described conventional dynamic scheduling techniques. Specifically, the conventional dynamic release and/or dynamic activation techniques cannot be used for URLLC as they violate one or both of the low latency requirement or the ultra-reliability requirement. For instance, after dynamic release of a block of SPS resources, the conventional dynamic activation technique requires a high reliable one-shot transmission of a scheduling assignment that cannot be guaranteed in practical scenarios.

The examples described herein overcome the problems with conventional SPS techniques by using a per-TTI release of blocks of SPS resources. In a per-TTI release, a block of SPS resources is released for a single TTI. Communication via the block of SPS resources automatically resumes in a next TTI unless another per-TTI release signal is received. Beneficially, the examples eliminate having to send an activation message to activate the block of SPS resources and satisfy the low latency and ultra-reliability requirements for URLLC.

Aspects of the disclosure are initially described in the context of a wireless communications system. The wireless communication system may utilize a per-TTI release of a block of SPS resources. Aspects of the disclosure are further illustrated by and described with reference to apparatus diagrams, system diagrams, and flowcharts that relate to semi-persistent scheduling for low-latency communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. The base stations 105, UEs 115, or both, may configure a block of SPS resources in multiple TTIs and utilize a per-TTI release for releasing the block of SPS resources on a TTI by TTI basis when there is insufficient priority data to communicate in a particular TTI.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless node, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet data network gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105-a may include subcomponents such as an access network entity 105-b, which may be an example of an access node controller (ANC). Each access network entity 105-b may communicate with a number of UEs 115 through a number of other access network transmission entities 105-c, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases wireless local area networks (WLANs) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200 T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. In other examples, the resource element may include a portion of a symbol period, or more than one symbol period, and may include one or more subcarriers. In some examples, a resource block may include more or fewer than 12 subcarriers, and, in some examples, the subcarriers may or might not be consecutive. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Conventional SPS techniques may take too long to schedule and/or are unable to meet stringent packet error rate requirements, such as those of URLLC. In conventional SPS techniques, a transmitter and a receiver may allocate and release uplink, downlink, or both, blocks of SPS resources for communication, and the release may be implicit or explicit. For an implicit release, if there is no data to be transmitted, the transmitter may transmit a message (e.g., a media access control packet data unit (MAC PDU)) containing a value zero (e.g., zero media access control service data unit (MAC SDU)) on the block of SPS resources. The receiver may clear a configured uplink grant after receiving a message including a number of consecutive new MAC PDUs each containing zero MAC SDUs on the block of SPS resources. For an explicit release, the transmitter may send a release message (e.g., a downlink control information (DCI) Format 0, an uplink control information (UCI) message, or the like) to indicate release of the block of SPS resources. Upon receiving the release message, the receiver may clear the configured uplink grant.

Conventional SPS techniques may also permit activation of released uplink and downlink blocks of SPS resources. After previously configuring a block of SPS resources (e.g. by radio resource control (RRC) messaging) in the UL direction that were subsequently released, the transmitter may send an SPS activation message (e.g., DCI Format 0 on SPS Cell Radio Network Temporary Identifier (C-RNTI), UCI, or the like) to activate the block of SPS resources in the UL direction. The receiver may use a grant provided in the SPS activation message to begin transmitting on the block of SPS resources. In the downlink direction, after configuring a block of SPS resources (e.g., by RRC messaging) in the DL direction that were subsequently released, the transmitter can send an SPS activation message (e.g., DCI Format 1/1A/2/2A/2B/2C on SPS C-RNTI, UCI, or the like) to activate the block of SPS resources in DL direction. The receiver may receive the SPS activation message and begin decoding the block of SPS resources.

The examples described herein disclose techniques for SPS for low-latency communications that overcome the issues with conventional techniques. Conventional techniques may take too long to schedule and/or are unable to meet stringent packet error rate requirements, such as those of URLLC. The examples described herein overcome the problems with conventional SPS techniques by using a per-TTI release of a block of SPS resources. Beneficially, communication via a block of SPS resources automatically resumes in a next TTI unless another per-TTI release signal is received. A further advantage is that there is no need to send an activation message to resume communication via a block of SPS resources in a next TTI, and hence the examples may satisfy the low latency and ultra-reliability requirements for URLLC.

Figure 2:
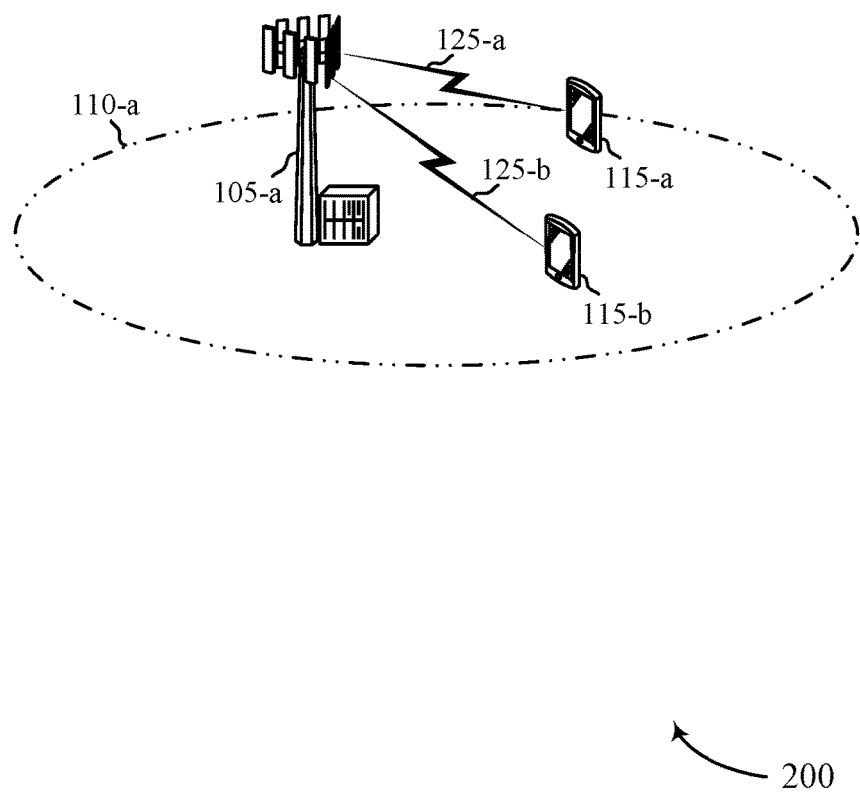
FIG. 2 illustrates an example of a wireless communication system that supports SPS for low-latency communications in accordance with aspects of the present disclosure.

FIG. 2 illustrates an example of a wireless communication system 200 for SPS for low-latency communications. Wireless communication system 200 may include a base station 105-a having a coverage area 110-a, and a first UE 115-a and a second UE 115-b within the coverage area 110-a. UE 115-a may communicate with base station 105-a via communication link 125-a, and UE 115-b may communicate with base station 105-a via communication link 125-b. Base station 105-a is an example of base station 105, and UEs 115-a, 115-b are examples of UE 115 of FIG. 1. A wireless communication device, such as base station 105-a, first UE 115-a, or second UE 115-a, may configure one or more blocks of SPS resources in more or more TTIs for communication with another wireless communication device. Once configured, either of the wireless communication devices may utilize a per-TTI release to release a block of SPS resources in a single TTI. Communication may immediately resume using the block of SPS resources in a next TTI unless another per-TTI release signal is received, as described in further detail below.

Figure 3:
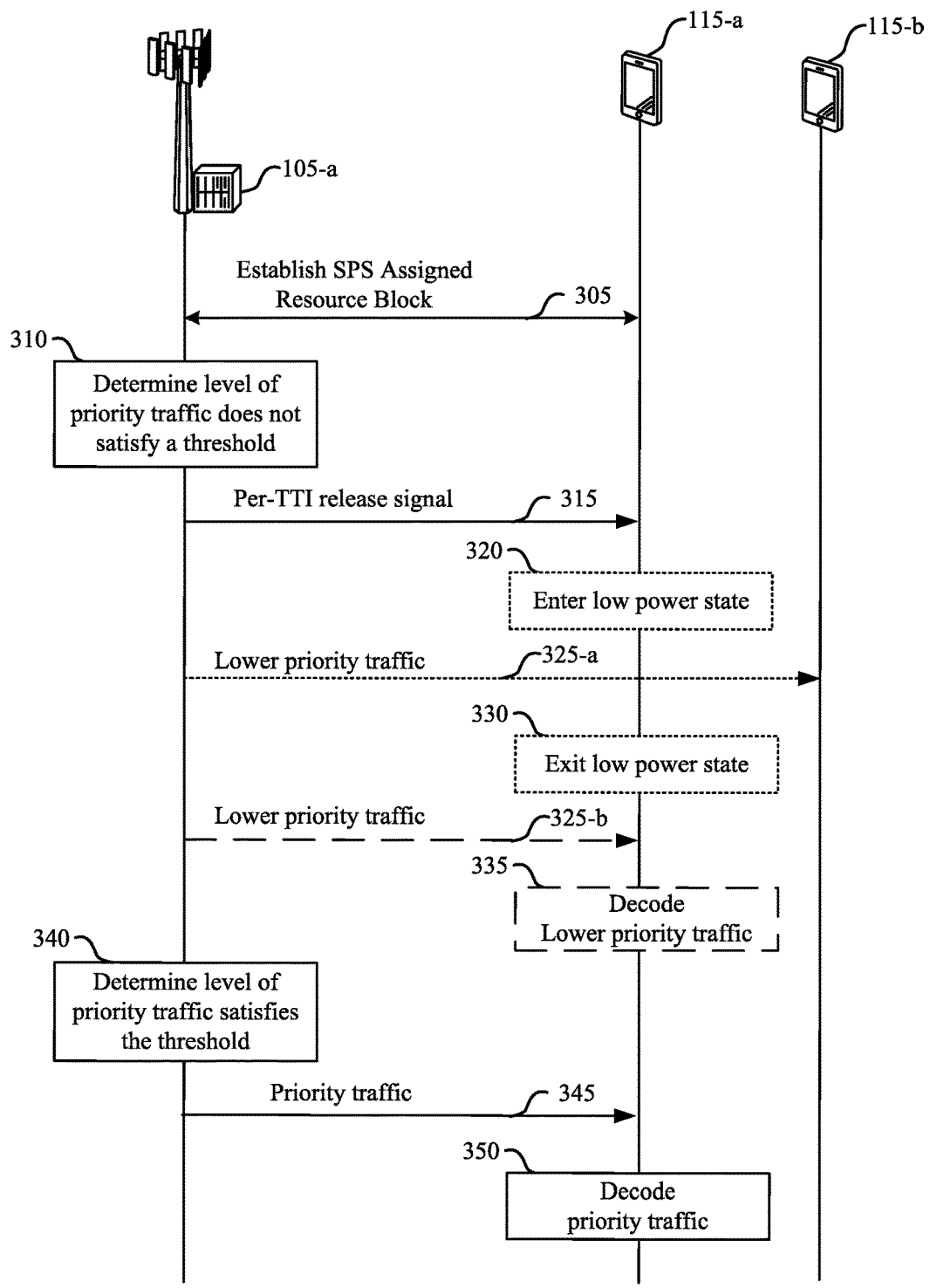
FIG. 3 illustrates an example of a process flow chart that supports SPS for low-latency communications in accordance with aspects of the present disclosure.

FIG. 3 illustrates an example of a process flow diagram 300 for SPS for low-latency communications. In this example, the base station 105-a and the UE 115-a of FIG. 2 may configure a downlink block of SPS resources for communication of priority traffic. The priority traffic may be, for example, mission critical data, URLLC data, or the like.

At operation 305, base station 105-a may coordinate with UE 115-a to establish a block of SPS resources in multiple TTIs. In an example, radio resource control (RRC) signaling may be exchanged to configure a block of SPS resources in multiple TTIs that may be used by the UE 115-a, the base station 105-a, or both, for downlink transmission of priority traffic. For example, the base station 105-a may allocate a block of SPS resources in a downlink data channel in one or more TTIs for communicating priority traffic to the UE 115-a. During establishing of the block of SPS resources, the base station 105-a may identify in which TTIs the block of SPS resources are allocated, including a beginning TTI and an ending TTI. The block of SPS resources may be assigned in every TTI for a period of time (e.g., next 100 TTIs), periodically within TTIs for a period of time (e.g., every fourth TTI of the next 100 TTIs), or a selected group of TTIs (e.g., TTI_1, TTI_3, TTI_32, TTI_36, TTI_59 in TTIs ranging from TTI_1 to TTI_100). The block of SPS resources may be one or more resource blocks, and may include a portion of a resource block. Base station 105-a may also allocate multiple blocks of SPS resources to the UE 115-a in each TTI, or may vary how many blocks of SPS resources are allocated from TTI to TTI.

Figure 4:
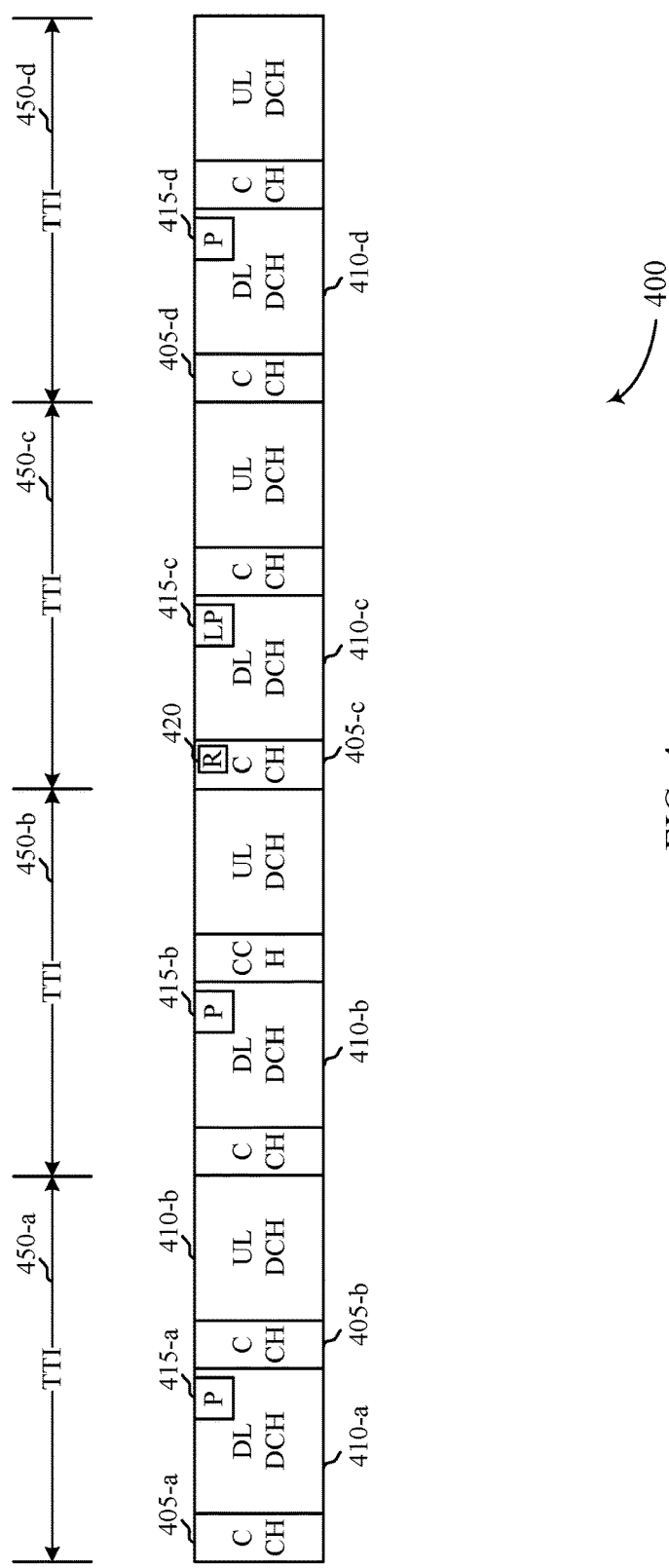
FIG. 4 illustrates an example of resource structures that support SPS for low-latency communications in accordance with aspects of the present disclosure.

Examples of resource structures including a downlink block of SPS resources is described below. FIG. 4 illustrates an example of resource structures 400 for SPS for low-latency communications. Depicted are multiple TTIs 450-a, 450-b, 450-c, and 450-d. Each TTI 450 may include a control channel (C CH) 405 and a data channel (DCH) 410. Examples of the control channel 405 include a physical downlink control channel (PDCCH), a physical uplink control channel (PUCCH), or the like. Examples of the data channel 410 include a physical downlink shared channel (PDSCH), physical uplink shared channel (PUSCH), or the like. In this example, base station 105-a may coordinate with UE 115-a to establish a block 415 of SPS resources in multiple TTIs 450. The block 415 may utilize the same time and frequency resources in each TTI, or may vary in time and/or frequency from TTI to TTI. As depicted, blocks 415-a, 415-b, 415-c, and 415-d respectively within data channels 410-a, 410-b, 410-c, and 410-d are allocated for transmission of priority traffic from base station 105-a to UE 115-a.

Even when blocks 415 are allocated, there may be TTIs 450 in which the base station 105-a does not have any priority traffic to send, or an insufficient amount of priority traffic to send. For efficient utilization of data channel 410, base station 105-a may send a per-TTI release signal to release the block of SPS resources of a single TTI. Base station 105-a may use the released block to transport other traffic, such as lower priority traffic. An example of lower priority traffic is enhanced mobile broadband (eMBB) data. In some examples, a traffic flow may have a traffic profile that includes a traffic ranking. Base station 105-a may retrieve a traffic profile for each available traffic flow having data available for transmission, and transmit, in the released resource block, data from the traffic flow having the highest traffic ranking. FIG. 4 merely shows a single example of resource structures 400 and is described from the perspective of base station 105-a. However, other allocations and set-ups of resource structures 400 may be used. Furthermore, UE 115-a may also perform the techniques described herein with respect to base station 105-a.

Returning again to FIG. 3, at operation 310, base station 105-a may determine a level of priority traffic available to send and determine that it lacks any, or an insufficient level of, priority traffic to send in a downlink block 415 of SPS resources of a next TTI. For example, the base station 105-a may compare an amount of priority traffic available to send to a threshold, and determine that the amount does not satisfy the threshold (e.g., less than the threshold).

At operation 315, base station 105-a may generate and send a per-TTI release signal to indicate that the downlink block 415 of a particular TTI is being released. Base station 105-a may determine that it lacks any priority traffic, or has insufficient priority traffic, to send in the block 415 in a particular TTI and may communicate the per-TTI release signal to release block 415 from exclusive priority traffic use. For example, with reference to FIG. 4, base station 105-a may determine that it lacks sufficient priority traffic to send in TTI 450-c. Based at least in part on this determination, the base station 105-a may communicate a per-TTI release signal R 420 in control channel 405-c of TTI 450-c to release block 415-c from being reserved for priority traffic. In one example, the per-TTI release signal R 420 may be a single bit included within control channel 405-c to indicate that block 415-c is being released from transporting priority traffic. The per-TTI release signal R 420 is sent in the control channel 405-c that immediately precedes the data channel 410-c including the block 415-c to be released. The base station 105-a may refrain from transmitting priority traffic in block 415-c.

Rather than permitting downlink block 415-c to go unused, base station 105-a may send lower priority (LP) traffic in block 415-c. The base station 105-a may include control data in the control channel 405-c for indicating which UE is to decode block 415-c, and hence the LP traffic may be sent to UE 115-a or a different UE (e.g., 115-b). With reference again to FIG. 3, operations 320, 325-a, and 330 of FIG. 3 correspond to the control data in the control channel 405-c indicating that UE 115-b is to decode block 415-c, and operations 325-b and 335 corresponds to the control data in the control channel 405-c indicating that UE 115-a is to decode block 415-c. Operations 320, 325-a, 325-b, 330, and 335 are shown in dashed lines as it is optional whether the UE 115-a performs the corresponding operations. Operations 320, 325-a, and 330 are shown with a first type of dashed line indicating they may be performed together. Operations 325-b and 335 are shown with a second type of dashed line indicating they may be performed together.

Starting at operation 315, UE 115-a may receive the per-TTI release signal R 420 and the control data in the control channel 405-c and may, at operation 320, process the received control data to determine that the block 415-c carries LP traffic addressed to a different UE. At this time, the UE 115-a optionally may enter a low power state. In the low power state, UE 115-a may partially or completely power down a decoder, receiver, hardware, circuitry, any combination thereof, or the like, for at least a portion of the downlink data channel 410-c of TTI 450-c. At operation 325-a, the base station 105-a may send lower priority (LP) traffic, such as, e.g., eMBB traffic. In this example, the LP traffic may be addressed to UE 115-b that receives and decodes the LP traffic. At operation 330, the UE 115-a may exit the low power state. The exit may occur at the end of the duration of TTI 450-c, at the end of the duration of downlink data channel 410-c, or at other suitable time.

In other examples, UE 115-a may skip entering and exiting the low power state. In one instance, the UE 115-a may fail to receive the per-TTI release signal R 420 and decode block 415 even though block 415 does not include priority traffic for UE 115-a. Doing so is acceptable as it would not violate the low latency and ultra-reliability constraints of URLLC. After the decode, the UE 115-a may determine that the block 415 includes lower priority traffic that it may simply discard.

With reference to operations 325-b and 330 of FIG. 3, the UE 115-a may process the control data in the control channel 405-c and determine that the block 415-c carries LP traffic addressed to UE 115-a. At operation 335, the UE 115-a may receive and decode the LP traffic sent within block 415-c.

At operation 340, the base station 105-a may determine that the level of priority traffic available to send satisfies the threshold for a next TTI (e.g., TTI 450-d). At operation 345, the base station 105-a may transmit the priority traffic to the UE 115-a within block 415. For example, with reference to FIG. 4, the base station 105-a may transmit the priority traffic to the UE 115-a within block 415-d. Because the per-TTI release signal R 420 only releases the block 415 for a single TTI (e.g., only for TTI 450-c), the base station 105-a beneficially does not have to send any activation message or other control data to instruct the UE 115-a to decode block 415 in the next TTI 450 (e.g., block 415-d of TTI 450-d). Rather, the default instruction when establishing the block 415 of SPS resources in multiple TTIs is that the UE 115-a is to decode the block 415 in each TTI 450 unless the per-TTI release signal R 420 is received in the control channel 405 of that TTI 450.

At operation 350, the UE 115-a may monitor for per-TTI release signal, determine that the control channel 405-d did not include the per-TTI release signal, and proceed to receive and decode the block 415-d of SPS resources within TTI 450-d.

The operations depicted in FIG. 3 may repeat one or more times in the same or different order. For the TTIs in which the base station 105-a determines that the amount of priority traffic does not satisfy the threshold, the base station 105-a and the UE 115-a may perform operations 310, 315, and optionally operations 320, 325-a, 325-b, 330, and 335. Thus, the base station 105-a may repeatedly inform the UE 115-a to release the block 415 of SPS resources by sending the per-TTI release signal in the control channel 410 of each TTI 450 until new or a sufficient amount of priority data arrives for transmission to the UE 115-a. For the TTIs in which the base station 105-a determines that the amount of priority traffic satisfies the threshold, the base station 105-a and the UE 115-a may perform operations 340, 345, and 350.

Figure 5:
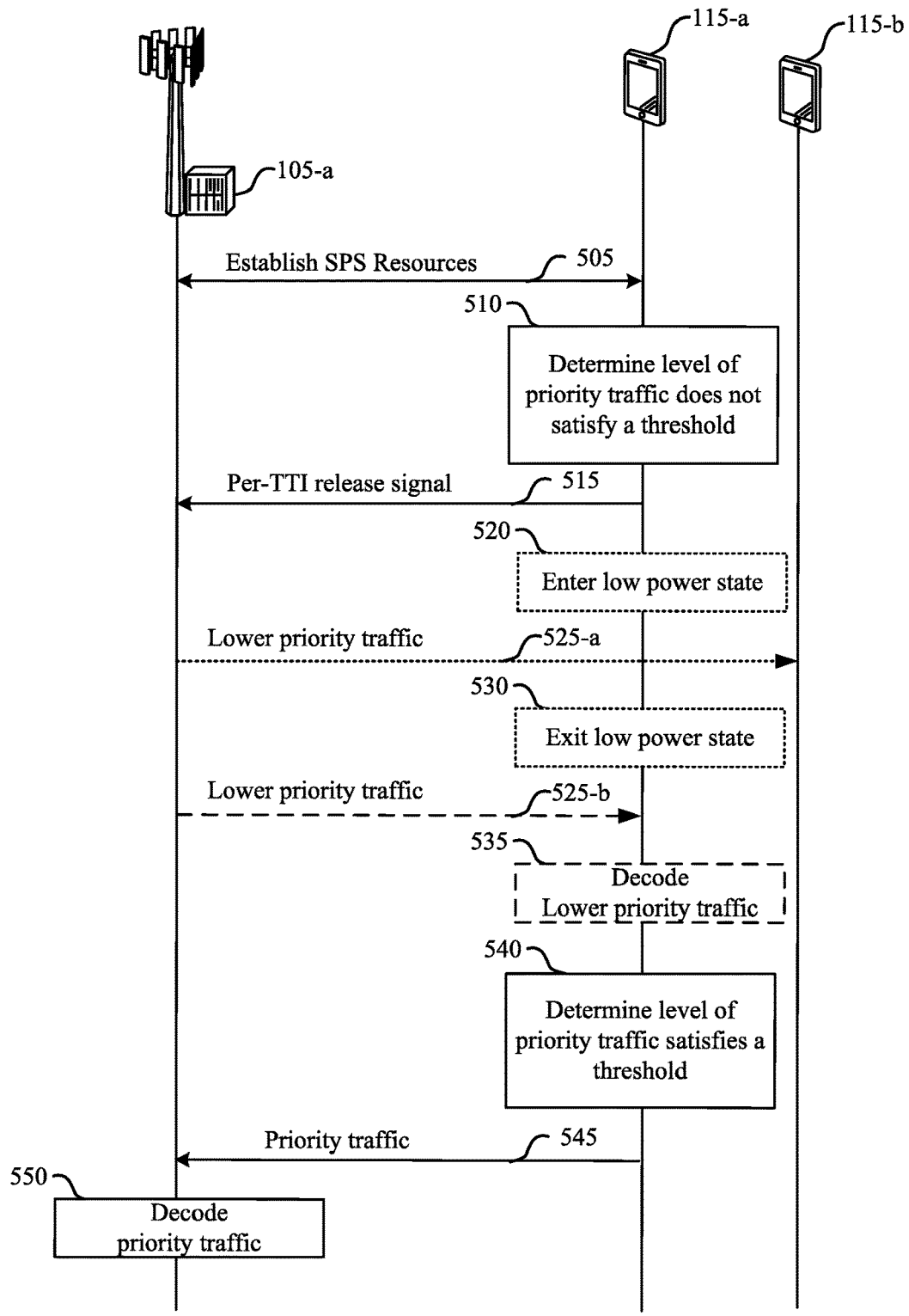
FIG. 5 illustrates an example of a process flow chart that supports SPS for low-latency communications in accordance with aspects of the present disclosure.
Figure 6:
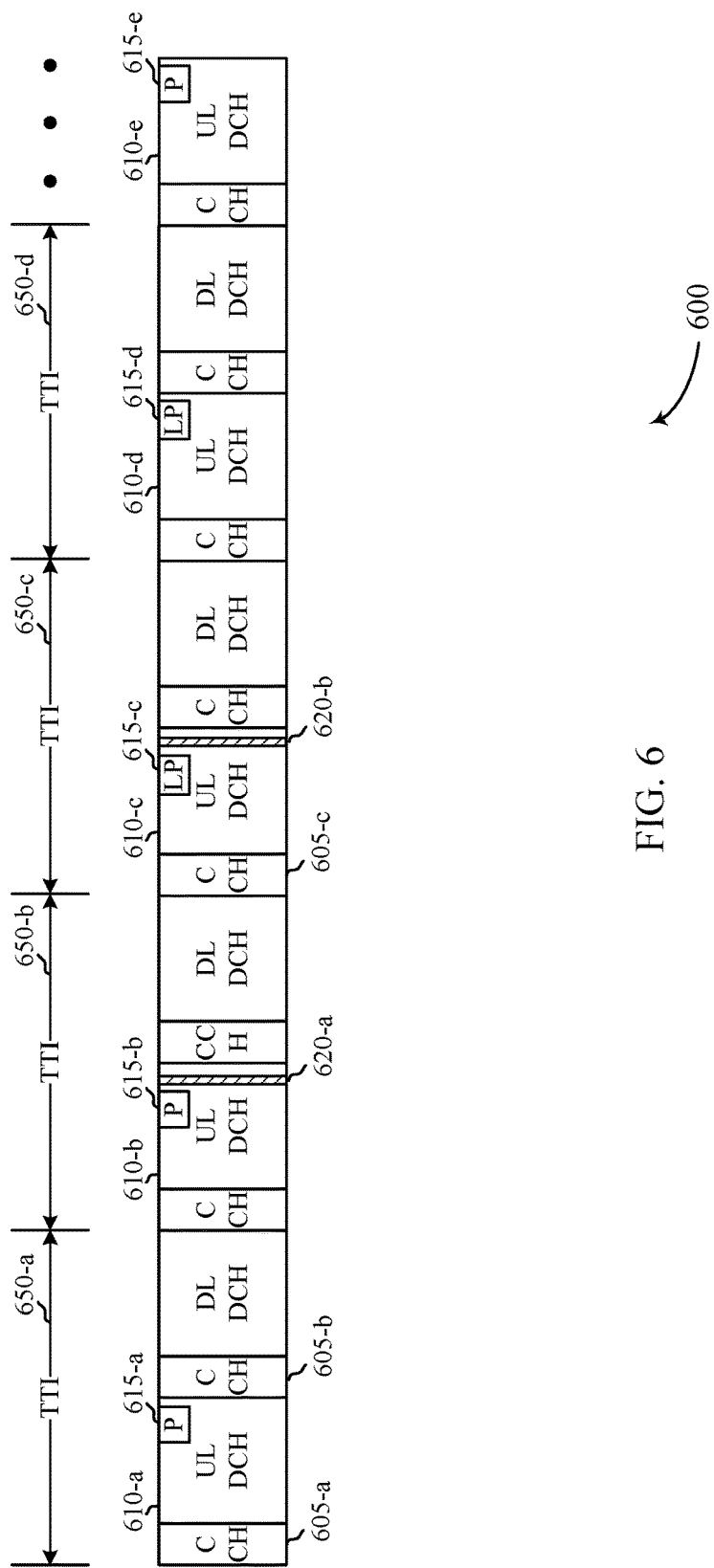
FIG. 6 illustrates an example of resource structures that support SPS for low-latency communications in accordance with aspects of the present disclosure.

The UE 115-a may similarly use a per-TTI release signal for releasing an uplink block of SPS resources, as further described in FIGS. 5-6. FIG. 5 illustrates an example of a process flow chart 500 for SPS for low-latency communications. At operation 505, UE 115-a may coordinate with base station 105-a to establish an uplink block of SPS resources in multiple TTIs, similar to operation 305 described above for establishing a downlink block of SPS resources.

Examples of resource structures including an uplink block of SPS resources is described below. FIG. 6 illustrates an example of resource structures 600 for SPS for low-latency communications. Depicted are multiple TTIs 650-a, 650-b, 650-c, and 650-d. Each TTI 650 may include a control channel (C CH) 605 and a data channel (DCH) 610. Control channel 605 is an example of control channel 405 of FIG. 4, and data channel 610 is an example of data channel 410 of FIG. 4. As depicted, blocks 615-a, 615-b, 615-c, 615-d, and 615-e respectively within data channels 610-a, 610-b, 610-c, 610-d, and 610-e are allocated for transmission of priority traffic from UE 115-a to base station 105-a.

Even though an uplink block 605 of SPS resources may be allocated, there may be TTIs 650 in which the UE 115-a does not have any priority traffic to send. For efficient utilization of data channel 610, UE 115-a may send a per-TTI release signal in a data channel of a current TTI to release an uplink block in a next TTI. FIG. 6 merely shows a single example of resource structures 600 and is described from the perspective of UE 115-a. However, other allocations and set-ups of resource structures 600 may be used. Furthermore, base station 105-a may perform the techniques described herein with respect to UE 115-a.

With reference again to FIG. 5, at operation 510 of FIG. 3, UE 115-a may determine a level of priority traffic available to send and determine that it lacks any, or an insufficient level of, priority traffic to send in an uplink block 615 of SPS resources in a next TTI. For example, the UE 115-*a* may compare an amount of priority traffic available to send to a threshold, and determine that the amount does not satisfy the threshold (e.g., less than the threshold). The threshold may be the same as used by the base station 105-*a* in operations 310 and 340, or may differ.

At operation 515, UE 115-*a* may generate and send a per-TTI release signal in a data channel 610 of a current TTI to release block 615 of a next TTI. The per-TTI release signal may release block 615 from exclusive priority traffic use. The UE 115-*a* may communicate the per-TTI release signal 620 in a data channel 610 of the TTI 650 that immediately precedes the next TTI 650 that includes the block 615 being released from being reserved for priority traffic. In one example, with reference to FIG. 6, the UE 115-*a* may send a per-TTI release signal 620-*a* (shown as a shaded vertical line) within data channel 610-*b* of TTI 650-*b* to indicate that block 615-*c* in data channel 610-*c* of TTI 650-*c* is being released. As above, the per-TTI release signal 620-*a* may be a single bit (e.g., '1' indicates release). UE 115-*a* may refrain from transmitting priority traffic in block 615-*c*.

Rather than permitting block 615-*c* to go unused, base station 105-*a* may send lower priority (LP) traffic in block 615-*c*. The base station 105-*a* may include control data in the control channel 605-*c* for indicating which UE is to decode block 615-*c*, and hence the LP traffic may be sent to UE 115-*a* or a different UE (e.g., 115-*b*). With reference again to FIG. 5, operations 520, 525-*a*, and 530 correspond to the control data in the control channel 605-*c* indicating that UE 115-*b* is to decode block 615-*c*, and operations 525-*b* and 535 corresponds to the control data in the control channel 605-*c* indicating that UE 115-*a* is to decode block 515-*c*. Operations 520, 525-*a*, 525-*b*, 630, and 535 are shown in dashed lines as it is optional whether the UE 115-*a* performs the corresponding operations. Operations 520, 525-*a*, and 530 are shown with a first type of dashed line indicating they may be performed together. Operations 525-*b* and 535 are shown with a second type of dashed line indicating they may be performed together.

Starting at operation 515, UE 115-*a* may send the per-TTI release signal 620 and may process the control data in the control channel 605-*c*. UE 115-*a* may, at operation 520, determine that the block 615-*c* carries LP traffic addressed to a different UE and optionally enter a low power state. In the low power state, UE 115-*a* may partially or completely power down a decoder, receiver, hardware, circuitry, any combination thereof, or the like, for at least a portion of the uplink data channel 610-*c* of TTI 650-*c*.

At operation 525-*a*, base station 105-*a* may transmit lower priority traffic to UE 115-*b* during the uplink block of SPS resources that have been released. In this example, the LP traffic may be addressed to UE 115-*b* that receives and decodes the LP traffic. At operation 530, UE 115-*a* may exit the low power state. In other examples, UE 115-*a* may skip entering and exiting the low power state, in a similar manner as described above.

In the other example, the UE 115-*a* may process the control data in the control channel 605-*c* and determine that block 615-*c* carries LP traffic addressed to UE 115-*a*. At operation 535, the UE 115-*a* may receive and decode the LP traffic sent within block 615-*c*.

At operation 540, UE 115-*a* may determine that the level of priority traffic available to send in a next TTI satisfies the threshold. At operation 545, UE 115-*a* may transmit the priority traffic to the base station 105-*a* in the next TTI 650. For example, with reference to FIG. 6, UE 115-*a* may refrain from sending the per-TTI release message in data channel 610-*d* due to the threshold being satisfied and transmit priority traffic in uplink block 615-*e* of SPS resources of a next TTI. At operation 550, base station 105 may monitor for per-TTI release signal, determine that the per-TTI release signal was not received, and receive and decode the priority traffic.

The operations depicted in FIG. 5 may repeat one or more times in the same or different order. For the TTIs in which the UE 115-*a* determines that the amount of priority traffic does not satisfy the threshold, the UE 115-*a* and the base station 105-*a* may perform operations 510, 515, and optionally operations 520, 525-*a*, 525-*b*, 530, and 535. In some instances, the UE 115-*a* may repeatedly inform the base station 105-*a* to release the block 615 of SPS resources by sending the per-TTI release signal in the uplink data channel 610 of each TTI 650 until new priority data arrives for transmission to the base station 105-*a*. For the TTIs in which the UE 115-*a* determines that the amount of priority traffic satisfies the threshold, the UE 115-*a* and the base station 105-*a* may perform operations 540, 545 and 550.

Beneficially, a per-TTI release of downlink and/or uplink blocks of SPS resources may be used to meet stringent latency and reliability requirements, such as for URLLC. A further advantage is that communication immediately resumes on a next TTI after a release thus eliminating the need to send an activation message to resume communication of priority traffic via SPS assigned resource blocks.

Figure 7:
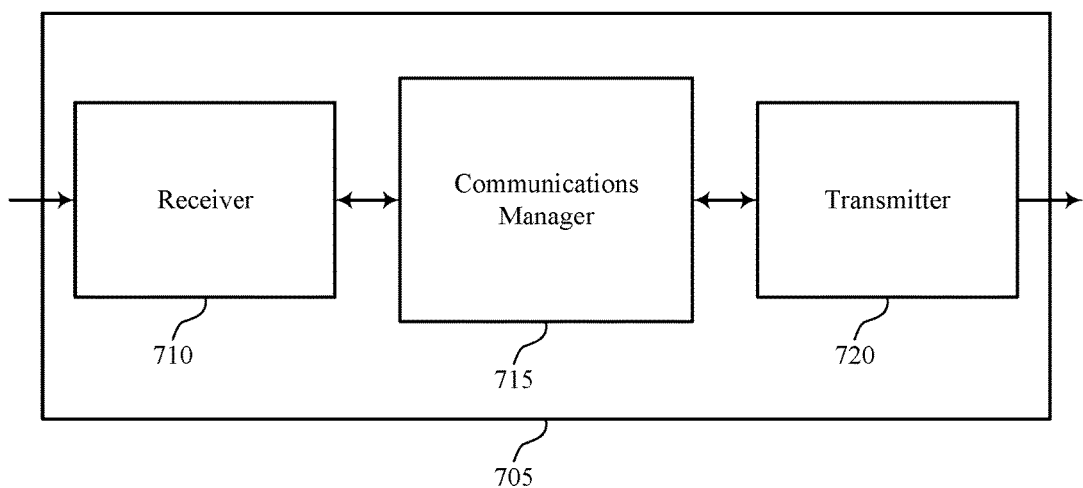
FIGS. 7 through 9 show block diagrams of a device that supports SPS for low-latency communications in accordance with aspects of the present disclosure.

FIG. 7 shows a block diagram 700 of a wireless device 705 that supports SPS for low-latency communications in accordance with various aspects of the present disclosure. Wireless device 705 may be an example of aspects of a user equipment (UE) 115 or base station 105 as described with reference to FIG. 1. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to SPS for low-latency communications, etc.). Information may be passed on to other components of the device. The receiver 710 may be an example of aspects of the transceiver 1035 described with reference to FIG. 10.

Communications manager 715 may be an example of aspects of the communications manager 1015 described with reference to FIG. 10. Communications manager 715 and/or at least some of its various sub-components may be implemented in hardware, software executed by a processor, firmware, or any combination thereof. If implemented in software executed by a processor, the functions of the communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 715 and/or at least some of its various sub-components may be physically located at various positions, including being distributed such that portions of functions are implemented at different physical locations by one or more physical devices. In some examples, communications manager 715 and/or at least some of its various sub-components may be a separate and distinct component in accordance with various aspects of the present disclosure. In other examples, communications manager 715 and/or at least some of its various sub-components may be combined with one or more other hardware components, including but not limited to a receiver, a transmitter, a transceiver, one or more other components described in the present disclosure, or a combination thereof in accordance with various aspects of the present disclosure.

Communications manager 715 may establish a block of SPS resources in each of a set of TTIs for transmission of priority traffic and determine that a level of priority traffic to transmit during a first TTI of the set of TTIs is below a priority traffic threshold.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may include a single antenna, or it may include a set of antennas.

Transmitter 720 may transmit a per-TTI release signal to indicate that the block of SPS resources in the first TTI is released from being reserved for priority traffic, refrain from transmitting priority traffic during the first TTI, and transmit lower priority traffic on the block of SPS resources in the first TTI. In some cases, the priority traffic is uplink priority traffic. Transmitter 720 may transmit priority traffic in the block of SPS resources in a subsequent TTI. In some cases, transmitting the per-TTI release signal includes transmitting the per-TTI release signal in the first TTI, where the wireless node is a base station and the priority traffic is downlink priority traffic. In some cases, the per-TTI release signal is a single bit. In some cases, transmitting the per-TTI release signal includes transmitting the per-TTI release signal in a second TTI of the set of TTIs that precedes the first TTI. In some cases, transmitting the per-TTI release signal includes transmitting the per-TTI release signal in a control channel of the first TTI. In some cases, transmitting the per-TTI release signal includes transmitting the per-TTI release signal in a data channel of a preceding TTI of the set of TTIs, where the preceding TTI occurs immediately prior to the first TTI.

Figure 8:
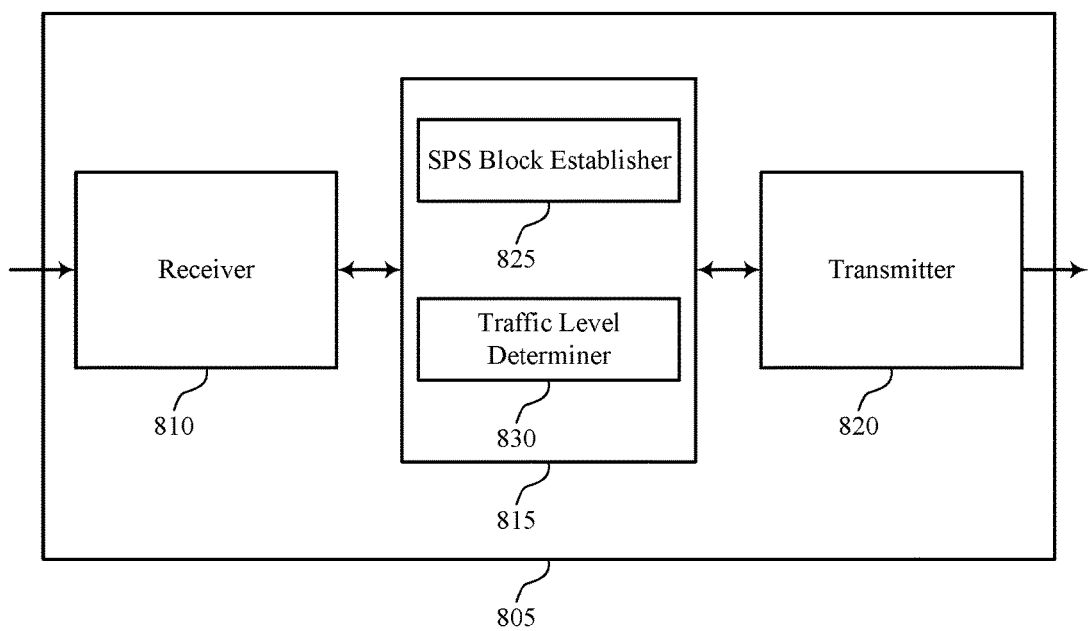

FIG. 8 shows a block diagram 800 of a wireless device 805 that supports SPS for low-latency communications in accordance with various aspects of the present disclosure. Wireless device 805 may be an example of aspects of a wireless device 705 or a UE 115 or base station 105 as described with reference to FIGS. 1 and 7. Wireless device 805 may include receiver 810, communications manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to SPS for low-latency communications, etc.). Information may be passed on to other components of the device. The receiver 810 may be an example of aspects of the transceiver 1035 described with reference to FIG. 10.

Communications manager 815 may be an example of aspects of the communications manager 1015 described with reference to FIG. 10. Communications manager 815 may also include SPS block establisher 825 and traffic level determiner 830.

SPS block establisher 825 may establish a block of SPS resources in each of a set of TTIs for transmission of priority traffic.

Traffic level determiner 830 may determine that a level of priority traffic to transmit during a first TTI of the set of TTIs is below a priority traffic threshold and determine that the priority traffic is available for transmission in a subsequent TTI of the set of TTIs, the subsequent TTI occurring immediately after the first TTI.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may include a single antenna, or it may include a set of antennas.

Figure 9:
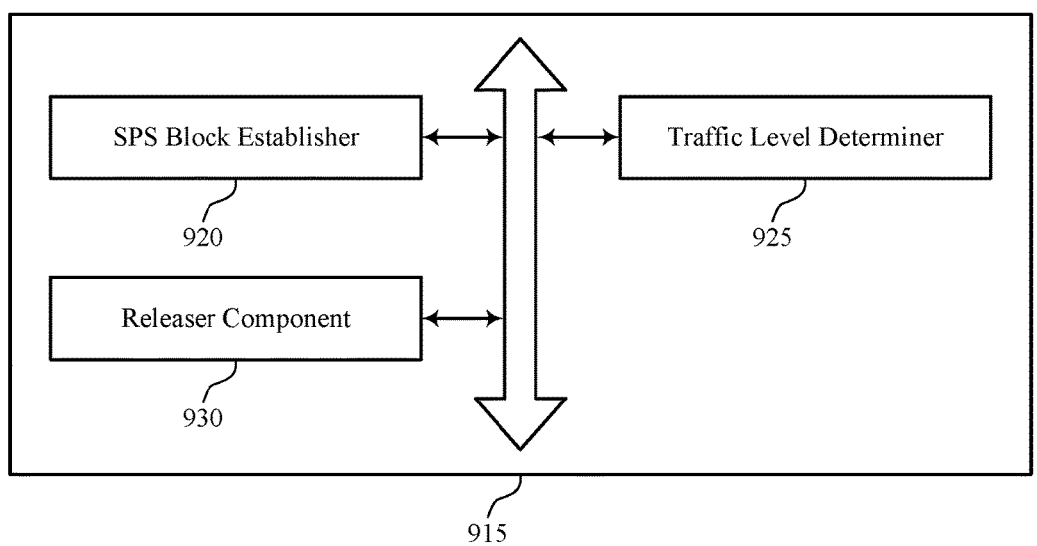

FIG. 9 shows a block diagram 900 of a communications manager 915 that supports SPS for low-latency communications in accordance with various aspects of the present disclosure. The communications manager 915 may be an example of aspects of a communications manager 715, a communications manager 815, or a communications manager 1015 described with reference to FIGS. 7, 8, and 10. The communications manager 915 may include SPS block establisher 920, traffic level determiner 925, and releaser component 930. Each of these modules may communicate, directly or indirectly, with one another (e.g., via one or more buses).

SPS block establisher 920 may establish a block of SPS resources in each of a set of TTIs for transmission of priority traffic. In some cases, each of the set of TTIs includes a control channel that temporally precedes a data channel.

Traffic level determiner 925 may determine that a level of priority traffic to transmit during a first TTI of the set of TTIs is below a priority traffic threshold and determine that the priority traffic is available for transmission in a subsequent TTI of the set of TTIs, the subsequent TTI occurring immediately after the first TTI.

Releaser component 930 may instruct a transmitter to enter a low power state during at least a portion of the first TTI.

Figure 10:
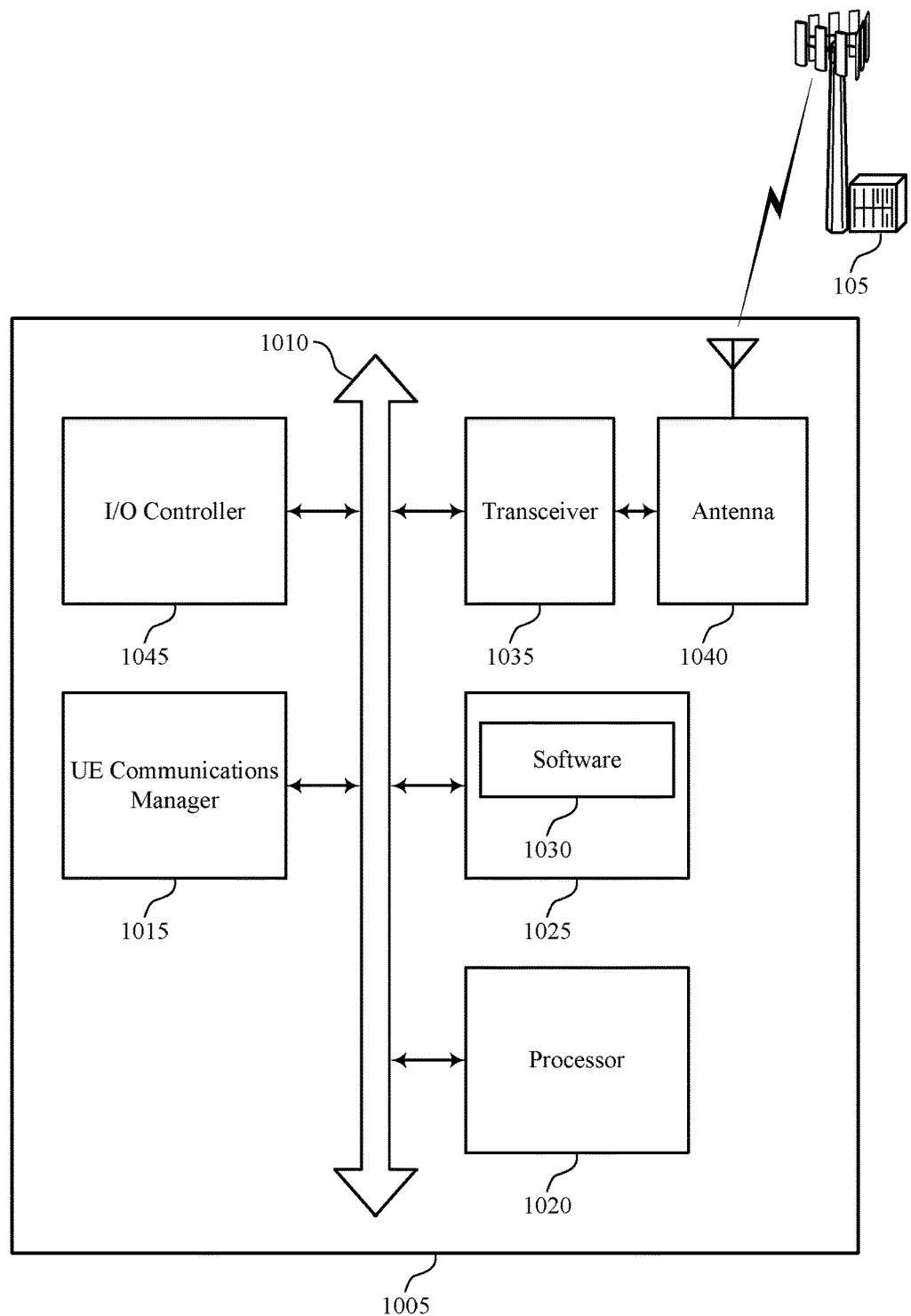
FIG. 10 illustrates a block diagram of a system including a user equipment (UE) that supports SPS for low-latency communications in accordance with aspects of the present disclosure.

FIG. 10 shows a diagram of a system 1000 including a device 1005 that supports SPS for low-latency communications in accordance with various aspects of the present disclosure. Device 1005 may be an example of or include the components of wireless device 705, wireless device 805, or a UE 115 as described above, e.g., with reference to FIGS. 1, 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting SPS for low-latency communications).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support SPS for low-latency communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system.

Figure 11:
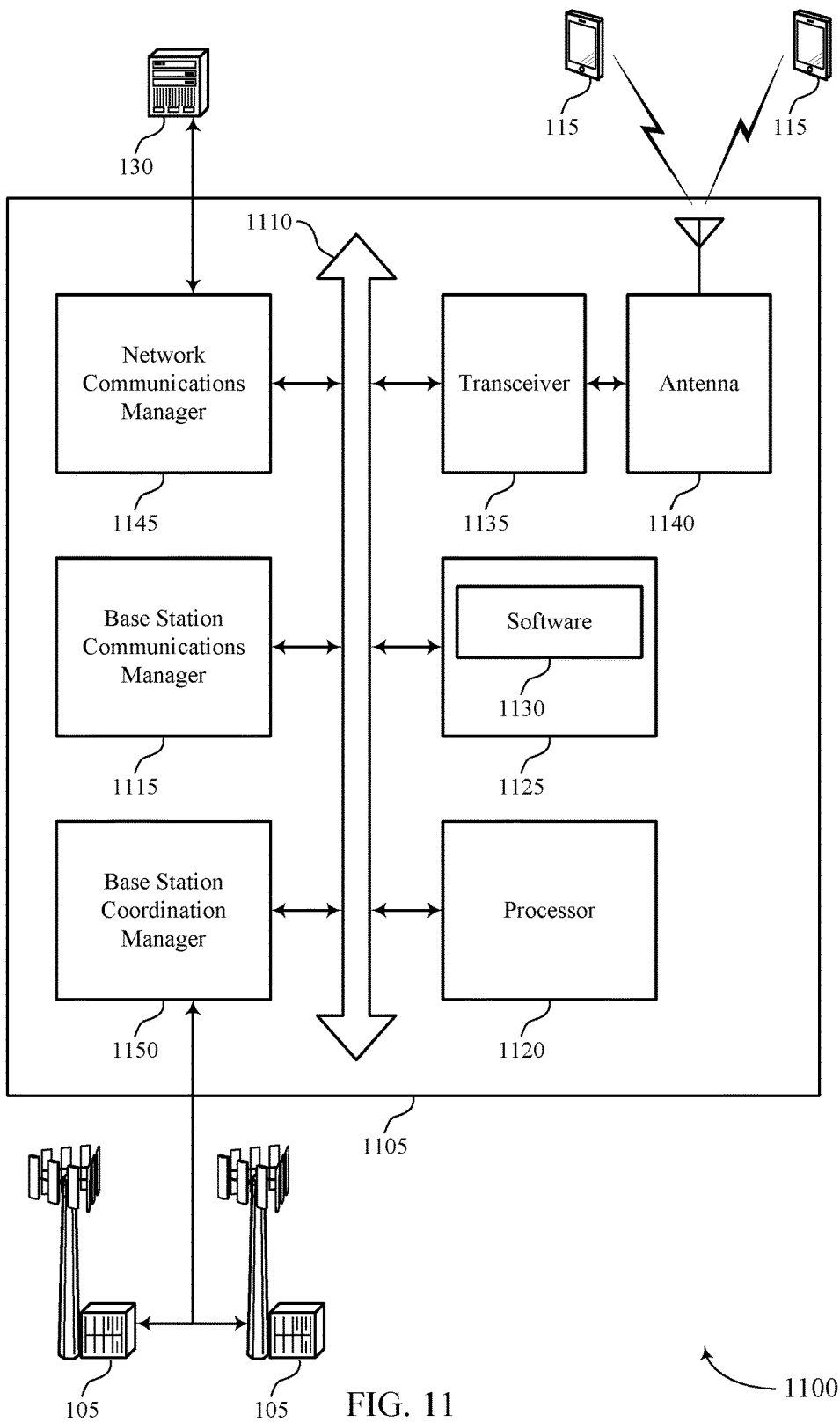
FIG. 11 illustrates a block diagram of a system including a base station that supports SPS for low-latency communications in accordance with aspects of the present disclosure.

FIG. 11 shows a diagram of a system 1100 including a device 1105 that supports SPS for low-latency communications in accordance with various aspects of the present disclosure. Device 1105 may be an example of or include the components of wireless device 805, wireless device 905, or a base station 105 as described above, e.g., with reference to FIGS. 1, 8 and 9. Device 1105 may include components for bi-directional voice and data communications including components for transmitting and receiving communications, including base station communications manager 1115, processor 1120, memory 1125, software 1130, transceiver 1135, antenna 1140, network communications manager 1145, and base station coordination manager 1150. These components may be in electronic communication via one or more buses (e.g., bus 1110). Device 1105 may communicate wirelessly with one or more UEs 115.

Base station communications manager 1115 may manage communications with other base station 105, and may include a controller or scheduler for controlling communications with UEs 115 in cooperation with other base stations 105. For example, the base station communications manager 1115 may coordinate scheduling for transmissions to UEs 115 for various interference mitigation techniques such as beamforming or joint transmission. In some examples, base station communications manager 1115 may provide an X2 interface within an Long Term Evolution (LTE)/LTE-A wireless communication network technology to provide communication between base stations 105.

Processor 1120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1120 may be configured to operate a memory array using a memory controller. In other cases, a memory controller may be integrated into processor 1120. Processor 1120 may be configured to execute computer-readable instructions stored in a memory to perform various functions (e.g., functions or tasks supporting SPS for low-latency communications).

Memory 1125 may include RAM and ROM. The memory 1125 may store computer-readable, computer-executable software 1130 including instructions that, when executed, cause the processor to perform various functions described herein. In some cases, the memory 1125 may contain, among other things, a BIOS which may control basic hardware and/or software operation such as the interaction with peripheral components or devices.

Software 1130 may include code to implement aspects of the present disclosure, including code to support SPS for low-latency communications. Software 1130 may be stored in a non-transitory computer-readable medium such as system memory or other memory. In some cases, the software 1130 may not be directly executable by the processor but may cause a computer (e.g., when compiled and executed) to perform functions described herein.

Transceiver 1135 may communicate bi-directionally, via one or more antennas, wired, or wireless links as described above. For example, the transceiver 1135 may represent a wireless transceiver and may communicate bi-directionally with another wireless transceiver. The transceiver 1135 may also include a modem to modulate the packets and provide the modulated packets to the antennas for transmission, and to demodulate packets received from the antennas.

In some cases, the wireless device may include a single antenna 1140. However, in some cases the device may have more than one antenna 1140, which may be capable of concurrently transmitting or receiving multiple wireless transmissions.

Network communications manager 1145 may manage communications with the core network (e.g., via one or more wired backhaul links). For example, the network communications manager 1145 may manage the transfer of data communications for client devices, such as one or more UEs 115.

Base station coordination manager 1150 may manage communications with other base station 105, and may include a controller or scheduler for controlling communications with UEs 115 in cooperation with other base stations 105. For example, the base station coordination manager 1150 may coordinate scheduling for transmissions to UEs 115 for various interference mitigation techniques such as beamforming or joint transmission. In some examples, base station coordination manager 1150 may provide an X2 interface within an LTE/LTE-A wireless communication network technology to provide communication between base stations 105.

Figure 12:
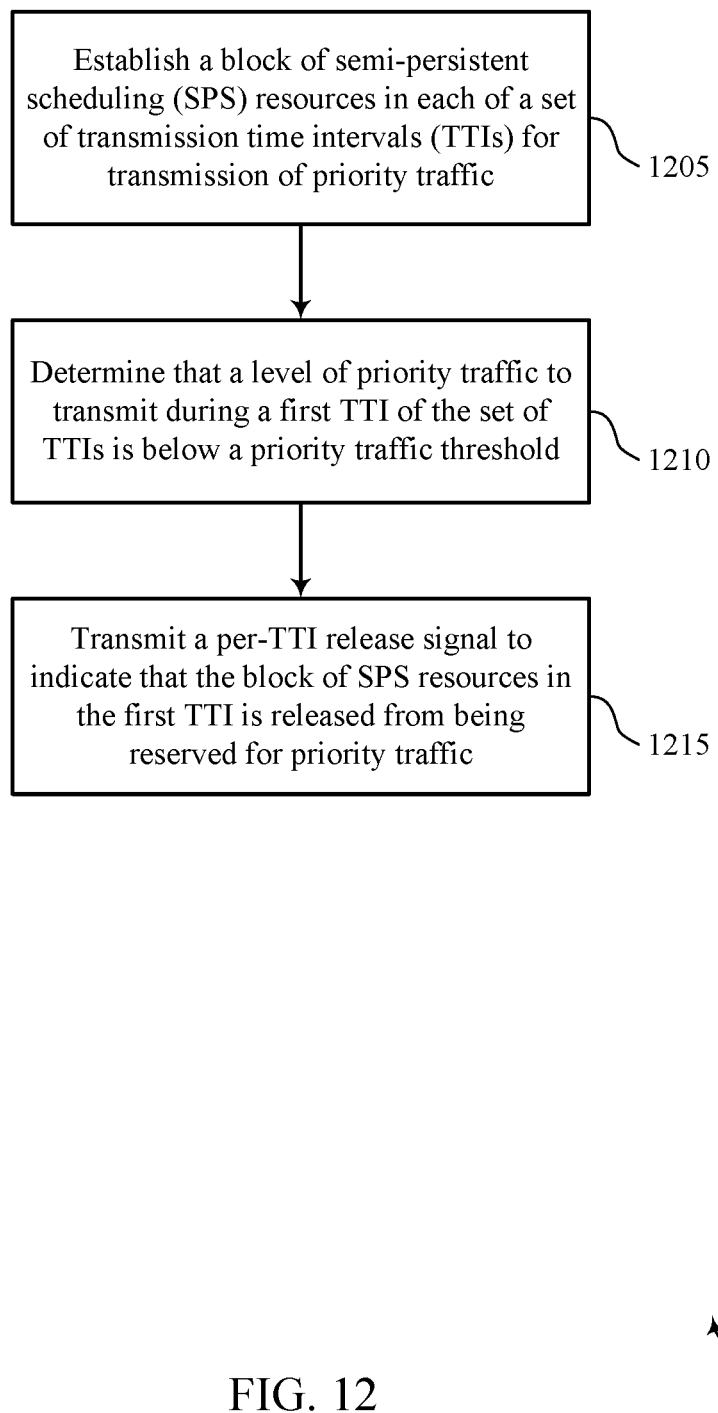
FIGS. 12 through 15 illustrate methods for SPS for low-latency communications in accordance with aspects of the present disclosure.

FIG. 12 shows a flowchart illustrating a method 1200 for SPS for low-latency communications in accordance with various aspects of the present disclosure. The operations of method 1200 may be implemented by a UE 115 or base station 105 or its components as described herein. For example, the operations of method 1200 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may establish a block of SPS resources in each of a plurality of transmission time intervals (TTIs) for transmission of priority traffic. The operations of block 1205 may be performed according to the methods described with reference to FIGS. 1 through 6. In certain examples, aspects of the operations of block 1205 may be performed by a SPS Block Establisher as described with reference to FIGS. 7 through 9.

At block 1210 the UE 115 or base station 105 may determine that a level of priority traffic to transmit during a first TTI of the plurality of TTIs is below a priority traffic threshold. The operations of block 1210 may be performed according to the methods described with reference to FIGS. 1 through 6. In certain examples, aspects of the operations of block 1210 may be performed by a Traffic Level Determiner as described with reference to FIGS. 7 through 9.

At block 1215 the UE 115 or base station 105 may transmit a per-TTI release signal to indicate that the block of SPS resources in the first TTI is released from being reserved for priority traffic. The operations of block 1215 may be performed according to the methods described with reference to FIGS. 1 through 6. In certain examples, aspects of the operations of block 1215 may be performed by a transmitter as described with reference to FIGS. 7 through 9.

Figure 13:
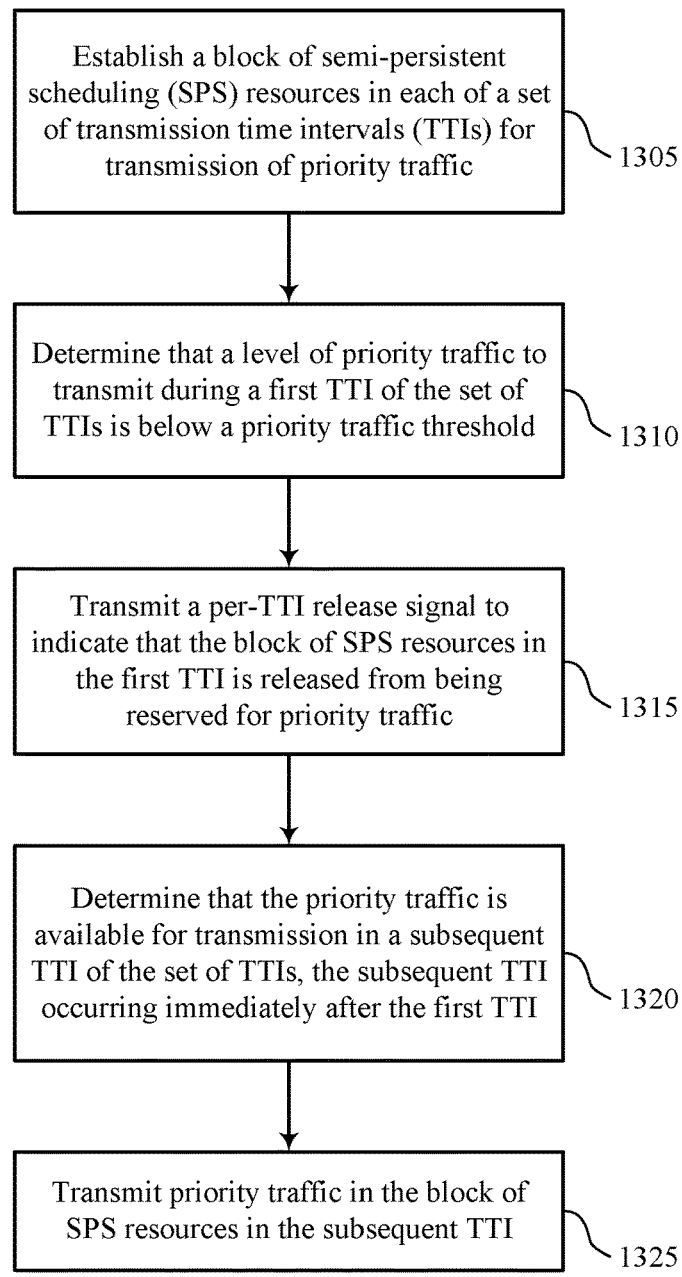

FIG. 13 shows a flowchart illustrating a method 1300 for SPS for low-latency communications in accordance with various aspects of the present disclosure. The operations of method 1300 may be implemented by a UE 115 or base station 105 or its components as described herein. For example, the operations of method 1300 may be performed by a communications manager as described with reference to FIGS. 7 through 9. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may establish a block of SPS resources in each of a plurality of transmission time intervals (TTIs) for transmission of priority traffic. The operations of block 1305 may be performed according to the methods described with reference to FIGS. 1 through 6. In certain examples, aspects of the operations of block 1305 may be performed by a SPS Block Establisher as described with reference to FIGS. 7 through 9.

At block 1310 the UE 115 or base station 105 may determine that a level of priority traffic to transmit during a first TTI of the plurality of TTIs is below a priority traffic threshold. The operations of block 1310 may be performed according to the methods described with reference to FIGS. 1 through 6. In certain examples, aspects of the operations of block 1310 may be performed by a Traffic Level Determiner as described with reference to FIGS. 7 through 9.

At block 1315 the UE 115 or base station 105 may transmit a per-TTI release signal to indicate that the block of SPS resources in the first TTI is released from being reserved for priority traffic. The operations of block 1315 may be performed according to the methods described with reference to FIGS. 1 through 6. In certain examples, aspects of the operations of block 1315 may be performed by a transmitter as described with reference to FIGS. 7 through 9.

At block 1320 the UE 115 or base station 105 may determine that the priority traffic is available for transmission in a subsequent TTI of the plurality of TTIs, the subsequent TTI occurring immediately after the first TTI. The operations of block 1320 may be performed according to the methods described with reference to FIGS. 1 through 6. In certain examples, aspects of the operations of block 1320 may be performed by a Traffic Level Determiner as described with reference to FIGS. 7 through 9.

At block 1325 the UE 115 or base station 105 may transmit priority traffic in the block of SPS resources in the subsequent TTI. The operations of block 1325 may be performed according to the methods described with reference to FIGS. 1 through 6. In certain examples, aspects of the operations of block 1325 may be performed by a transmitter as described with reference to FIGS. 7 through 9.

Figure 14:
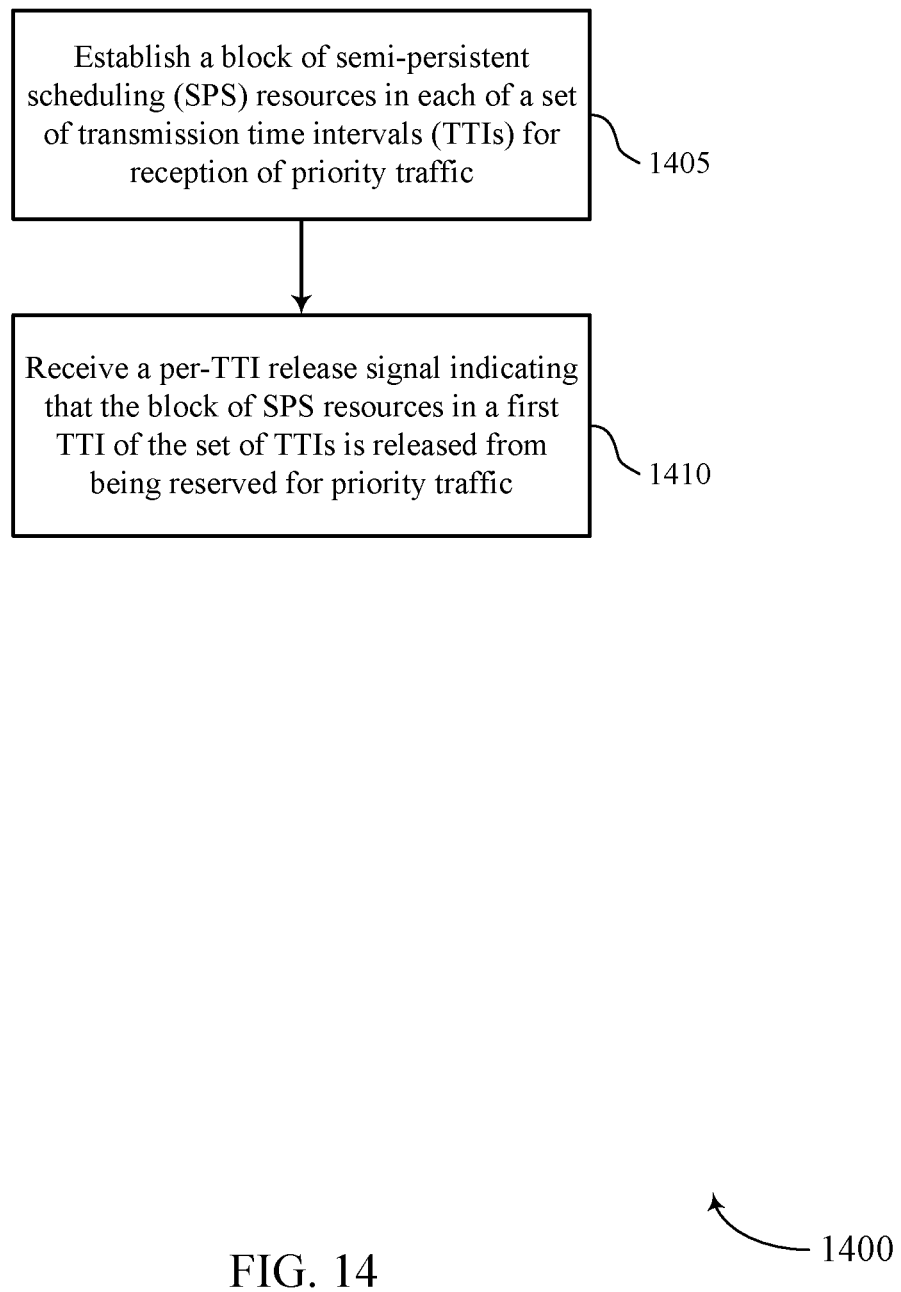

FIG. 14 shows a flowchart illustrating a method 1400 for SPS for low-latency communications in accordance with various aspects of the present disclosure. The operations of method 1400 may be implemented by a UE 115 or its components as described herein. For example, the operations of method 1400 may be performed by a UE communications manager as described with reference to FIG. 10. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may establish a block of SPS resources in each of a plurality of transmission time intervals (TTIs) for reception of priority traffic. The operations of block 1405 may be performed according to the methods described with reference to FIGS. 1 through 6. In certain examples, aspects of the operations of block 1405 may be performed by a SPS Block Establisher as described with reference to FIG. 10.

At block 1410 the UE 115 may receive a per-TTI release signal indicating that the block of SPS resources in a first TTI of the plurality of TTIs is released from being reserved for priority traffic. The operations of block 1410 may be performed according to the methods described with reference to FIGS. 1 through 6. In certain examples, aspects of the operations of block 1410 may be performed by a receiver as described with reference to FIG. 10.

Figure 15:
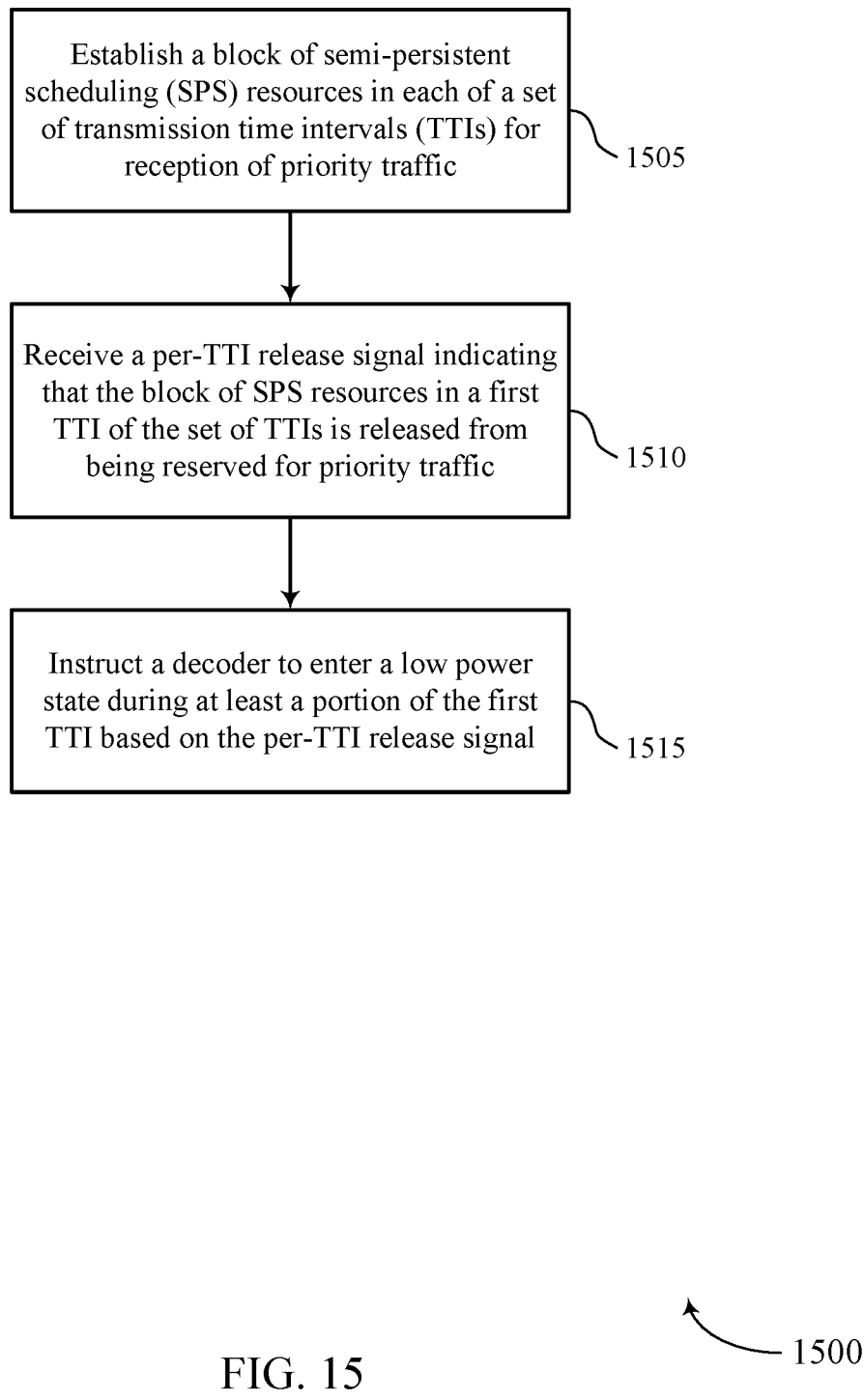

FIG. 15 shows a flowchart illustrating a method 1500 for SPS for low-latency communications in accordance with various aspects of the present disclosure. The operations of method 1500 may be implemented by a UE 115 or its components as described herein. For example, the operations of method 1500 may be performed by a UE communications manager as described with reference to FIG. 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may establish a block of SPS resources in each of a plurality of transmission time intervals (TTIs) for reception of priority traffic. The operations of block 1505 may be performed according to the methods described with reference to FIGS. 1 through 6. In certain examples, aspects of the operations of block 1505 may be performed by a SPS Block Establisher as described with reference to FIG. 10.

At block 1510 the UE 115 may receive a per-TTI release signal indicating that the block of SPS resources in a first TTI of the plurality of TTIs is released from being reserved for priority traffic. The operations of block 1510 may be performed according to the methods described with reference to FIGS. 1 through 6. In certain examples, aspects of the operations of block 1510 may be performed by a receiver as described with reference to FIG. 10.

At block 1515 the UE 115 may instruct a decoder to enter a low power state during at least a portion of the first TTI based at least in part on the per-TTI release signal. The operations of block 1515 may be performed according to the methods described with reference to FIGS. 1 through 6. In certain examples, aspects of the operations of block 1515 may be performed by a Releaser Component as described with reference to FIG. 10.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a wireless node, comprising:
    establishing a block of semi-persistent scheduling (SPS) resources in each of a plurality of transmission time intervals (TTIs) for transmission of priority traffic;
    determining that a level of priority traffic to transmit during a first TTI of the plurality of TTIs is below a priority traffic threshold; and
    transmitting a per-TTI release signal, in a preceding TTI of the plurality of TTIs that occurs prior to the first TTI, to indicate that the block of SPS resources in the first TTI is released from being reserved for the priority traffic.

2. The method of claim 1, further comprising:
    refraining from transmitting the priority traffic during the first TTI.

3. The method of claim 1, further comprising:
    transmitting lower priority traffic on the block of SPS resources in the first TTI.

4. The method of claim 1, further comprising:
    determining that the priority traffic is available for transmission in a subsequent TTI of the plurality of TTIs, the subsequent TTI occurring immediately after the first TTI; and
    transmitting the priority traffic in the block of SPS resources in the subsequent TTI.

5. The method of claim 1, wherein
the wireless node is a user equipment (UE) and the priority traffic is uplink priority traffic.

6. The method of claim 1, further comprising:
instructing a transmitter to enter a low power state during at least a portion of the first TTI.

7. The method of claim 1, wherein transmitting the per-TTI release signal comprises:
transmitting the per-TTI release signal in a data channel of the preceding TTI of the plurality of TTIs, wherein the preceding TTI occurs immediately prior to the first TTI.

8. The method of claim 1, wherein the per-TTI release signal is a single bit.

9. A method for wireless communication by a wireless node, comprising:
establishing a block of semi-persistent scheduling (SPS) resources in each of a plurality of transmission time intervals (TTIs) for reception of priority traffic; and
receiving a per-TTI release signal, in a preceding TTI of the plurality of TTIs that occurs prior to a first TTI of the plurality of TTIs, indicating that the block of SPS resources in the first TTI is released from being reserved for the priority traffic.

10. The method of claim 9, further comprising:
releasing, based at least in part on the per-TTI release signal, the block of SPS resources in the first TTI from being reserved for the priority traffic.

11. The method of claim 9, further comprising:
receiving lower priority traffic on the block of SPS resources in the first TTI.

12. The method of claim 9, further comprising:
monitoring for a subsequent per-TTI release signal for determining whether the block of SPS resources in a subsequent TTI of the plurality of TTIs is released from exclusive priority traffic use.

13. The method of claim 9, wherein
the wireless node is a base station and the priority traffic is uplink priority traffic.

14. The method of claim 9, further comprising:
instructing a decoder to enter a low power state during at least a portion of the first TTI based at least in part on the per-TTI release signal.

15. The method of claim 9, wherein receiving the per-TTI release signal comprises:
receiving the per-TTI release signal in a data channel of the preceding TTI of the plurality of TTIs, wherein the preceding TTI occurs immediately prior to the first TTI.

16. The method of claim 9, wherein the per-TTI release signal is a single bit.

17. An apparatus for wireless communication, comprising:
means for establishing a block of semi-persistent scheduling (SPS) resources in each of a plurality of transmission time intervals (TTIs) for transmission of priority traffic;
means for determining that a level of priority traffic to transmit during a first TTI of the plurality of TTIs is below a priority traffic threshold; and
means for transmitting a per-TTI release signal, in a preceding TTI of the plurality of TTIs that occurs prior to the first TTI, to indicate that the block of SPS resources in the first TTI is released from being reserved for the priority traffic.

18. An apparatus for wireless communication, comprising:
means for establishing a block of semi-persistent scheduling (SPS) resources in each of a plurality of transmission time intervals (TTIs) for reception of priority traffic; and
means for receiving a per-TTI release signal, in a preceding TTI of the plurality of TTIs that occurs prior to a first TTI of the plurality of TTIs, indicating that the block of SPS resources in the first TTI is released from being reserved for the priority traffic.

19. An apparatus for wireless communication, in a system comprising:
a processor;
memory in electronic communication with the processor; and
instructions stored in the memory and operable, when executed by the processor, to cause the apparatus to:
establish a block of semi-persistent scheduling (SPS) resources in each of a plurality of transmission time intervals (TTIs) for transmission of priority traffic;
determine that a level of priority traffic to transmit during a first TTI of the plurality of TTIs is below a priority traffic threshold; and
transmit a per-TTI release signal, in a preceding TTI of the plurality of TTIs that occurs prior to the first TTI, to indicate that the block of SPS resources in the first TTI is released from being reserved for the priority traffic.

20. The apparatus of claim 19, wherein the instructions are further executable by the processor to:
refrain from transmitting the priority traffic during the first TTI.

21. The apparatus of claim 19, wherein the instructions are further executable by the processor to:
transmit lower priority traffic on the block of SPS resources in the first TTI.

22. The apparatus of claim 19, wherein the instructions are further executable by the processor to:
determine that the priority traffic is available for transmission in a subsequent TTI of the plurality of TTIs, the subsequent TTI occurring immediately after the first TTI; and
transmit the priority traffic in the block of SPS resources in the subsequent TTI.

23. The apparatus of claim 19, wherein
the apparatus is a user equipment (UE) and the priority traffic is uplink priority traffic.

24. The apparatus of claim 19, wherein the instructions are further executable by the processor to:
instruct a transmitter to enter a low power state during at least a portion of the first TTI.

25. The apparatus of claim 19, wherein the instructions executable by the processor to transmit the per-TTI release signal comprise instructions executable by the processor to:
transmit the per-TTI release signal in a data channel of the preceding TTI of the plurality of TTIs, wherein the preceding TTI occurs immediately prior to the first TTI.

26. The apparatus of claim 19, wherein the per-TTI release signal is a single bit.

27. An apparatus for wireless communication, in a system comprising:
a processor;
memory in electronic communication with the processor; and instructions stored in the memory and operable, when executed by the processor, to cause the apparatus to:

establish a block of semi-persistent scheduling (SPS) resources in each of a plurality of transmission time intervals (TTIs) for reception of priority traffic; and receive a per-TTI release signal, in a preceding TTI of the plurality of TTIs that occurs prior to a first TTI of the plurality of TTIs, indicating that the block of SPS resources in the first TTI is released from being reserved for the priority traffic.

28. The apparatus of claim 27, wherein the instructions are further executable by the processor to:

release, based at least in part on the per-TTI release signal, the block of SPS resources in the first TTI from being reserved for the priority traffic.

29. The apparatus of claim 27, wherein the instructions are further executable by the processor to:

receive lower priority traffic on the block of SPS resources in the first TTI.

30. The apparatus of claim 27, wherein the instructions are further executable by the processor to:

monitor for a subsequent per-TTI release signal for determining whether the block of SPS resources in a subsequent TTI of the plurality of TTIs is released from exclusive priority traffic use.

31. The apparatus of claim 27, wherein
the apparatus is a base station and the priority traffic is uplink priority traffic.

32. The apparatus of claim 27, wherein the instructions are further executable by the processor to:

instruct a decoder to enter a low power state during at least a portion of the first TTI based at least in part on the per-TTI release signal.

33. The apparatus of claim 27, wherein the instructions executable by the processor to receive the per-TTI release signal comprise instructions executable by the processor to:

receive the per-TTI release signal in a data channel of the preceding TTI of the plurality of TTIs, wherein the preceding TTI occurs immediately prior to the first TTI.

34. The apparatus of claim 27, wherein the per-TTI release signal is a single bit.

* * * * *